Sept. 29, 1959    R. W. DOWNIN    2,905,949
FLUSH VALVE ASSEMBLY
Filed Oct. 28, 1955
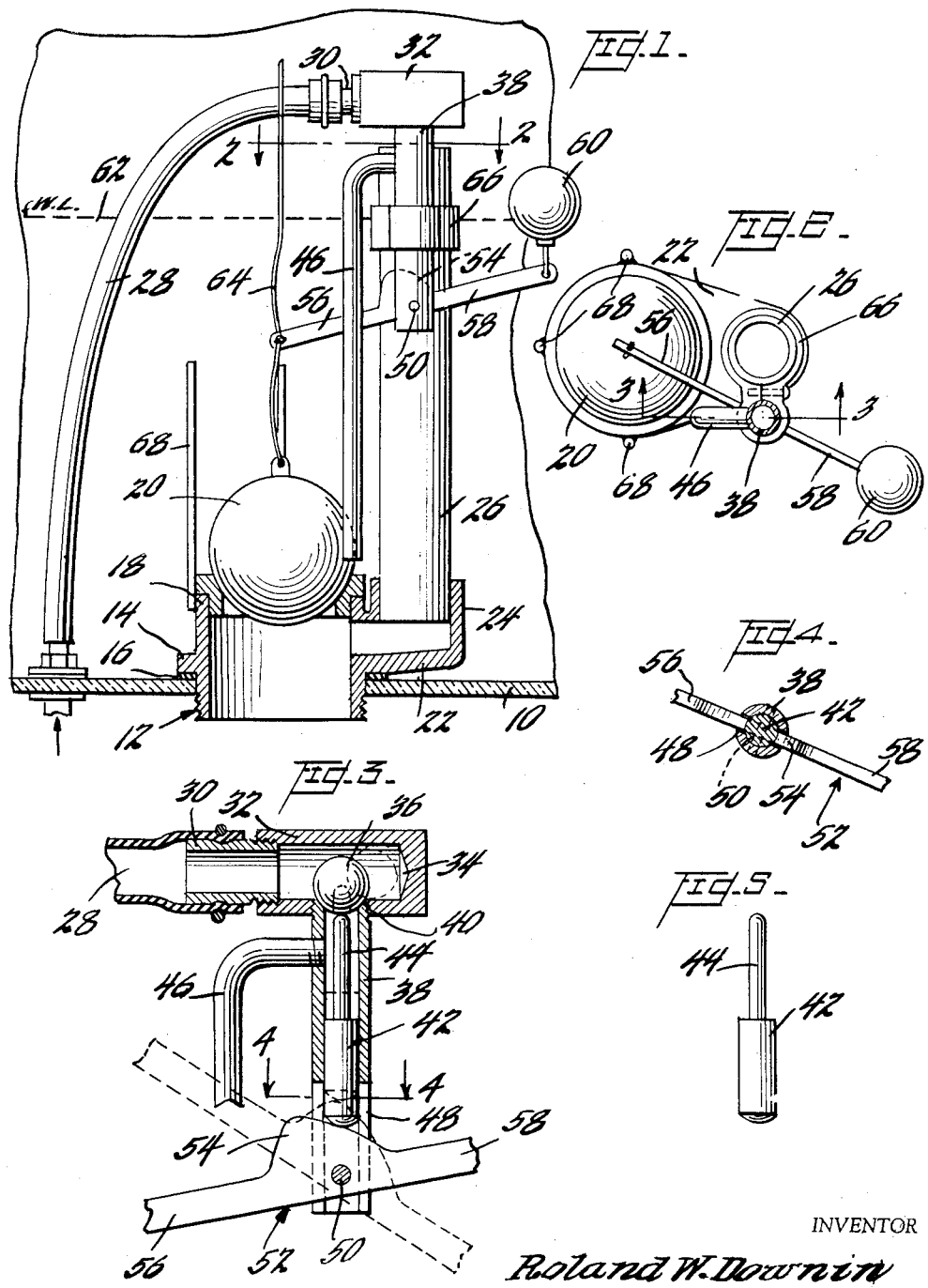
INVENTOR
Roland W. Downin
BY Parker and Walsh
ATTORNEYS

United States Patent Office 2,905,949
Patented Sept. 29, 1959

2,905,949

FLUSH VALVE ASSEMBLY

Roland W. Downin, Port Deposit, Md., assignor to Valguard Company, Inc., Port Deposit, Md., a corporation of Maryland Application October 28, 1955, Serial No. 543,495

4 Claims. (Cl. 4—41)

This invention relates to a flush valve assembly for domestic flush tanks.

Existing apparatus of this character generally consists of a flush ball operated by a trip lever and a float controlled ball-cock. Although the overflow pipe generally associated with the outlet is sometimes used to support the ball-cock, the actual operation of the two mechanisms is essentially independent.

The existing apparatus is made up of a considerable number of parts having many points of contact with a corresponding opportunity for wear at the points of contact.

Such apparatus is also frequently subject to leakage. This leakage comes about, first of all because of the numerous points at which connections are made, there being the possibility of leakage at each of the joints. Also leakage may come about due to the wear between working parts.

Due to the construction of the conventional type of ball-cock, it closes at a decreasing rate as the flush tank is filled. Such an arrangement is conducive to the producing of whistling and singing noises as the valve is closed.

The ordinary ball-cock valve is one which normally tends to remain open, being kept closed by a filled tank. This condition is conducive to leakage.

It is my purpose to provide a flush tank assembly which may be integrated in part with existing apparatus or it may be substituted entirely for the existing apparatus.

Such new apparatus is characterized by the much smaller number of working parts as well as a smaller number of points of wear.

Furthermore, both the inlet and outlet valves are free moving balls so that they can be seated at an infinite number of points thereby to distribute and minimize the wear.

My inlet valve is so constructed that it is normally kept closed by the pressure of the water supply so that leakage is prevented by the positive pressure of the water supply acting in the valve.

For a fuller understanding of my invention reference should be made to the accompanying drawing wherein:

Figure 1 is an elevation, partly in section, of the invention, also showing certain related parts;

Figure 2 is a plan view, partly in section, along the line 2—2 of Figure 1;

Figure 3 is an enlarged elevation of a part of the invention, parts being shown in section, taken along the line 3—3 of Figure 2;

Figure 4 is a section taken along the line 4—4 of Figure 3; and

Figure 5 is an elevational view of the plunger pin.

Referring now to the drawing, within the tank 10 is seated a combined fitting 12 in the outlet thereof. The fitting is of generally ring shape, being threaded at its lower end for engagement with other outlet fittings. At an intermediate point, it has a flange 14 for compressing gasket 16 to create a tight seal in the outlet opening of tank 10. The upper rim 18 is shown with a replaceable seat for the flush ball 20. If desired the seat may be made integral as is usually conventional.

The fitting has a lateral extension 22, terminating in a shoulder 24 which receives overflow pipe 26. Most plumbing codes require an overflow standpipe of sufficient diameter to prevent flush tanks from overflowing when the inlet valve is leaking. The standpipe 26 extends to a point substantially below the top level of the tank 10. For purposes of economy, most overflow pipes are of such thin wall thickness that any attempt to remove one a year or so after installation will result in the breaking off of the pipe where it is usually threaded into collar 24. In the event of extensive corrosion, a frequent occurrence due to slight differences of chemical compositions between the standpipe and the fitting, small leaks will develop at the thread line between the standpipe and the collar of the fitting, resulting in substantial loss of water. Such leaks are difficult to detect and equally difficult to get at. For reasons which will become apparent, I prefer to use a relatively large and substantial standpipe.

From a suitable point, usually near the bottom of tank 10, a supply line 28 is brought to valve body 32 within the tank 10. The supply line 28, preferably made of a slightly resilient, long-lasting plastic composition, is secured to valve body 32 by means of coupling 30 in suitable, water-tight manner.

The valve body 32, of generally rectangular shape, has a bore 34 of sufficient diameter to permit valve ball 36 to move freely along its length. Extending from the bottom of the valve body is plunger tube 38. The upper end of plunger tube 38 is suitably finished as a seat 40 for valve ball 36 so that, when resting upon seat 40, the ball 36 will not permit the passage of water from the body 32.

Within plunger tube 38 is plunger 42, sliding freely but with sufficient snugness to be kept in proper alignment within the tube 38. The upper portion 44 of the plunger is of reduced diameter forming a pin therefor. It is preferred to round the end of the pin 44 to reduce the area of contact between the pin and valve ball 36, and to round the lower end of the plunger 42 to facilitate its movement over cam surface 54. A delivery tube 46 of a cross-section at least equal to the difference in the cross-section of plunger tube 38 and plunger pin 44, extends outwardly and downwardly from plunger tube 38 to a point somewhat above the bottom of tank 10.

At its lower end, plunger tube 38 is slotted sufficiently deeply to allow the lower portion of plunger 42 to extend a short distance into slot 48. Pivot pin 50 passes through the arms on each side of slot 48 to rockably support actuating bar 52. Immediately above the pivot point, the actuating bar carries a cam surface 54 of somewhat semi-circular shape, having a high side adjacent lift arm 56 of the bar and a low side 58 adjacent the float arm of the bar. The arm 58 is normally kept uppermost by means of float ball attached to the outer end of the float arm. Float ball 60 floats at the normal water level 62 within the tank.

When the water is at the normal water level, holding the actuating bar in the position shown in full lines in Figure 1, then the plunger 42 is at a position sufficiently low to keep plunger pin 44 out of contact with valve ball 36 so that it rests in sealing relation on seat 40. When the lift arm 56 is raised by trip line 64, the cam moves into a position that will raise plunger 42 sufficiently far to displace ball 36 from its seat 40.

It will be noted that the valve body 32, the delivery tube 46 and the actuating bar 52 are all securely fastened to the plunger tube 38. By means of a figure-8 clamp 66, one loop of which embraces overflow tube 26 and the other plunger tube 38, the entire operative mechanism is supported within tank 10 in such manner that it can be bodily removed for repairs.

To assist in retaining flush ball 20 which is necessarily buoyant in position for proper seating, cage wires 68 may be placed about the upper opening of fitting 12. By appropriate proportioning of the parts of the fitting 12, overflow pipe 26 may be set close enough to the path of ball 20 so that it functions as one of the cage members.

The operation of the device is as follows:

Assuming that tank 10 is substantially empty, the actuating bar 52 will take such a position that pin 44 prevents ball 36 from resting on seat 40. Water will pass through supply tube 26 into valve body 32, through the seat opening 40 and delivery to 46 to fill tank 10, until water level 62 is approximately reached. As the float 60 rises, the plunger 42 will drop until pin 44 is out of contact with ball 36. As ball 36 approaches the seat 40, the water pressure in line 28 acts to insure seating of the ball, even though there is opportunity for some lateral movement of ball 36 in bore 34. The elastic nature of tube 28 tends to absorb any water hammer in the system and the arrangement of the ball within the body seals the system against much of the leakage common to most tank filling mechanisms. It is also pointed out that both balls 20 and 36 are capable of a great deal of movement with respect to their respective seats so that the wear is distributed over a large area and its adverse effect thereby minimized.

When the trip line 64 is lifted, the initial flow of water between ball 20 and seat 18 is substantial so that actuating bar 52, besides being lifted by arm 56, is held down by the dropping of float 60. However, as the water level drops rapidly, ball 20 settles into its seat and the tank begins to fill again repeating the previous cycle. Normally, when the tank is filled, there is a slight slackness in the trip line 64.

It will be readily understood that by reason of the freedom of movement possessed by both the inlet valve ball and the outlet ball that it is not probable that either one will seat itself in exactly the same position on successive openings and closings. In consequence wear is minimized and effective sealing is facilitated.

The operation of the inlet valve is entirely silent so far as the usual whining or whistling attributable to a gradual reduction in the size of the opening through which the water flows. It is preferred to construct at least the ball and preferably the valve body as well of non-metallic material and in such case, there is no audible rattle or chatter of the ball within the valve body.

When the inlet line 28 is constructed of somewhat elastic, non-metallic tubing, there is usually sufficient elasticity to overcome all water hammer.

Although the inlet valve and its float control are primarily designed for operation in conjunction with the other portions of the invention, it will be apparent that they are suited to use separately, if so desired.

I claim:

1. A flush valve assembly including a flush ball, an outlet fitting, said fitting including a flush ball seat; means for receiving an overflow pipe and a channel connecting the overflow pipe with the outlet below the seat, an overflow pipe, an inlet valve including a valve body, an inlet in the body connected to a source of liquid supply, an outlet in the valve body, a circular valve seat in the outlet, a ball free to move and rotate in all directions within the valve body and normally held upon the valve seat by the natural tendency of liquid flow from inlet to outlet, a cylinder opening into said outlet, a plunger freely rotatable about its axis of movement and freely movable longitudinally in said cylinder, said plunger having a reduced diameter at the end adjacent the valve, to permit the passage of liquid about the reduced portion, a liquid outlet for said cylinder, means responsive to a drop in the liquid level in the flush tank for moving the plunger in the cylinder toward the valve end thereof to unseat the valve ball whereby liquid may flow in succession from the liquid supply, through the valve body and the cylinder into the tank to restore the liquid level thereof and means for securing the valve apparatus on the overflow pipe.

2. A flush valve assembly including an outlet fitting, said fitting including a flush ball seat; means for receiving an overflow pipe and a channel connecting the overflow pipe with the outlet below the seat, an overflow pipe, an inlet valve including a valve body, an inlet in the body connected to a source of liquid supply, an outlet in the valve body, a circular valve seat in the outlet, a spherical ball freely movable in all directions in the valve body and normally held upon the valve seat by the natural tendency of liquid flow from inlet to outlet, a cylinder opening into said outlet, a free piston plunger movable longitudinally in said cylinder, said plunger having a reduced diameter at the end adjacent the valve, to permit the passage of liquid about the reduced portion, a liquid outlet for said cylinder, a flush ball, trip means for unseating the flush ball, cam means in said cylinder remote from the valve end thereof, a float in said tank, a lever connecting said float and said cam to move the cam to drive the plunger toward the valve to unseat the valve ball, means connecting the trip means with the cam to cause the cam to open the inlet valve by the same movement that opens the flush valve and means for securing the valve apparatus on the overflow pipe.

3. A valve apparatus for maintaining the liquid level in a tank comprising, a hollow valve body, an inlet in the body connected to a source of liquid supply, an outlet in the valve body, a circular valve seat in the outlet, a spherical ball, freely movable throughout the interior of the valve body and normally held upon the valve seat by the natural tendancy of liquid flow from inlet to outlet, a cylinder opening into said valve outlet, a free plunger loosely movable longitudinally in said cylinder, said plunger having a reduced cross-section for a substantial portion of its length at its upper end adjacent the valve outlet, to permit the passage of liquid about said reduced portion, a liquid outlet in said cylinder opposite the travel path of said reduced portion of said plunger, means responsive to a drop in the liquid level for moving the plunger in the cylinder toward the valve end thereof to unseat the valve ball whereby liquid may flow in succession from the liquid supply, through the valve body and the cylinder into the tank to restore the liquid level thereof and means for mounting the apparatus within the tank.

4. A valve comprising a hollow valve body, an inlet in said body for connection to a source of liquid supply, an outlet in the valve body, a circular seat in the outlet, a ball within said body, of less diameter than any of the three internal dimensions of the body and of greater diameter than the outlet seat; said ball being free to move and rotate in all directions therewithin, whereby it may be normally held upon the seat by the natural tendency of liquid flow from inlet to outlet, a cylinder opening into said outlet, a piston free to reciprocate and rotate in said cylinder and of greater length than the bore of said cylinder, said piston having a reduced diameter at the end adjacent the valve body, an outlet for said cylinder in the wall thereof adjacent the slender portion of the piston, and means for urging the piston inwardly in the cylinder to unseat the ball, thereby to permit fluid flow through the valve.

(References on following page)

References Cited in the file of this patent

UNITED STATES PATENTS

| | | |
|---|---|---|
| 1,140,712 | Price | May 25, 1915 |
| 1,476,029 | Black | Dec. 4, 1923 |
| 1,601,210 | Haas | Sept. 28, 1926 |
| 2,430,765 | Garrigan | Nov. 11, 1947 |
| 2,488,457 | Wallner | Nov. 15, 1949 |
| 2,628,362 | Birkmaier | Feb. 17, 1953 |
| 2,678,451 | Allen | May 18, 1954 |

FOREIGN PATENTS

| | | |
|---|---|---|
| 39,861 | Austria | Nov. 25, 1909 |